(12) United States Patent
Melius

(10) Patent No.: US 7,011,284 B2
(45) Date of Patent: Mar. 14, 2006

(54) PIVOTABLE CLAMP

(75) Inventor: Ron Melius, Tenino, WA (US)

(73) Assignee: Truck Accessories Group, Inc., Elkhart, IN (US)

( * ) Notice: Subject to any disclaimer, the term of this patent is extended or adjusted under 35 U.S.C. 154(b) by 0 days.

(21) Appl. No.: 10/171,925

(22) Filed: Jun. 14, 2002

(65) Prior Publication Data

US 2003/0230697 A1 Dec. 18, 2003

(51) Int. Cl.
*A47B 97/00* (2006.01)

(52) U.S. Cl. ................. 248/503; 248/229.11; 269/218; 269/239

(58) Field of Classification Search ............... 248/503, 248/229.1, 229.11, 284.1, 500, 510; 296/100.04, 296/100.07, 100.16, 100.17, 100.18; 269/239, 269/246, 249
See application file for complete search history.

(56) References Cited

U.S. PATENT DOCUMENTS

| | | | | |
|---|---|---|---|---|
| RE19,304 E | * | 9/1934 | Marogg ...................... 269/157 |
| 2,726,693 A | * | 12/1955 | Saxton ...................... 269/157 |
| 2,726,694 A | * | 12/1955 | Saxton ...................... 269/218 |
| 3,071,368 A | * | 1/1963 | Harding ...................... 269/215 |
| 4,143,869 A | * | 3/1979 | Paterson et al. ............ 269/166 |
| 4,258,908 A | * | 3/1981 | Goff et al. .................... 74/335 |
| 4,558,853 A | * | 12/1985 | Janerstal et al. .............. 269/71 |
| 4,619,447 A | * | 10/1986 | Blake ......................... 269/221 |
| 4,889,021 A | * | 12/1989 | Morrison ..................... 81/325 |
| 5,121,960 A | * | 6/1992 | Wheatley ................ 296/100.18 |
| 5,487,585 A | * | 1/1996 | Wheatley ................ 296/100.18 |
| 5,529,297 A | * | 6/1996 | Sawdon ...................... 269/239 |
| 5,860,691 A | * | 1/1999 | Thomsen et al. ...... 296/100.18 |
| 5,961,109 A | * | 10/1999 | Dykstra et al. ............. 269/228 |
| 6,155,547 A | * | 12/2000 | Gatanas ........................ 269/6 |
| 6,543,836 B1 | * | 4/2003 | Wheatley ............... 296/100.18 |
| 2003/0057726 A1 | * | 3/2003 | Wheatley ............... 296/100.18 |

FOREIGN PATENT DOCUMENTS

CH 595942 A * 2/1978 .................. 269/239

OTHER PUBLICATIONS

Tite-Lok, "Chevy S-10," at least as early as Feb. 14, 2002.
Pickup Specialties, "Roll N Lock," at least as early as May 21, 2002.
Pace-Edwards, "Clamp Parts & Functions," Instructions for Installing Bedlocker, p. 5, at least as early as Jan., 2001.

* cited by examiner

Primary Examiner—Robert P. Olszewski
Assistant Examiner—Timothy S. Smith
(74) Attorney, Agent, or Firm—Mayer, Brown, Rowe & Maw LLP

(57) ABSTRACT

A pivotable clamp is provided. One embodiment of the present invention comprises a clamp that includes a first member that is pivotably coupled to a second member. A third member is pivotally coupled to the second member. The first member is sized to slidably engage a rail that is part of a retractable cover system. An alternative embodiment of the present invention comprises a pivot block that includes a pivot slot. A rail engaging member is slidably coupled to the pivot block, and a pivot arm is pivotably mounted in the pivot slot. This embodiment may include a second pivot slot sized to pivotably receive the pivot arm.

13 Claims, 4 Drawing Sheets

PIVOTABLE CLAMP

FIELD OF THE INVENTION

This present invention generally relates to clamps. More particularly, the invention concerns a pivotable clamp.

BACKGROUND OF THE INVENTION

Trucks comprise the largest segment of the automotive market. Their popularity has increased with the popularity of sport utility vehicles (SUVs). This popularity has also spawned several hybrid or crossover vehicle designs that mix elements from both vehicle types. The cargo area in trucks and in some SUVs and hybrids is open and any items placed therein are exposed to the elements and to the risk of theft. Several different types of covers have been developed to enclose the open cargo area in these vehicles. These include canvas or other covers which are strapped, snapped or otherwise attached to the vehicle. However, snapping and unsnapping the multiple snaps is tedious and difficult, which discourages the use of the cargo area. Moreover, the snapped covers do not prevent theft, as they cannot be locked.

Sophisticated retractable covers that use a plurality of inter-locked articulating slats have been developed to provide security for the cargo area. These cover systems include rails that are attached to the vehicle for guiding the cover that is rolled into a canister when not in use. One shortcoming of these systems is that the installation of the rails to the vehicle requires the drilling of precisely located holes in the vehicle, thus permanently marring the vehicle and requiring a skill that is beyond that of the average vehicle owner.

Therefore, there exists a need for a clamp that enables the installation of the rails to the vehicle without the need to drill holes.

SUMMARY OF THE INVENTION

In order to overcome the deficiencies with known conventional clamps, a pivotable clamp is provided. Briefly, the pivoting clamp eliminates the need to form holes in the vehicle. The pivoting clamp is also easy to install, thereby allowing the average consumer to install a retractable cover system to their vehicle.

One embodiment of the present invention comprises a clamp that includes a first member that is pivotably coupled to a second member. A third member is pivotally coupled to the second member. The first member is sized to slidably engage a rail that is part of a retractable cover system.

An alternative embodiment of the present invention comprises a pivot block that includes a pivot slot. A rail engaging member is slidably coupled to the pivot block, and a pivot arm is pivotably mounted in the pivot slot. This embodiment may include a second pivot slot sized to pivotably receive the pivot arm.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 5 is yet another embodiment clamp.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In vehicles, such as pickup trucks, sport utility vehicles (SUVs), boats, or open-bed trailers, there are open areas that are exposed to the elements. It is often desirable to provide a cover over these areas to secure and protect items placed within them. The present invention provides a clamp that can be used to install the rails of the retractable cover system without drilling holes in the vehicle.

The present invention clamp can be used to install a retractable cover system on pickup trucks, sport utility vehicles (SUVs), and hybrid and crossover vehicles that combine features found in passenger cars, trucks and SUVs, such as the CHEVROLET AVALANCHE (CHEVROLET and AVALANCHE are trademarks of the General Motors Corporation of Detroit, Mich.). The present invention clamp may also be installed on open-bed trailers, and other types of recreational vehicles, such as boats. One embodiment of the present invention is structured to be installed in the utility bed, or truck bed of a pickup truck. The utility bed is the open area located behind the truck cab that terminates at the truck tailgate.

Figure 1:
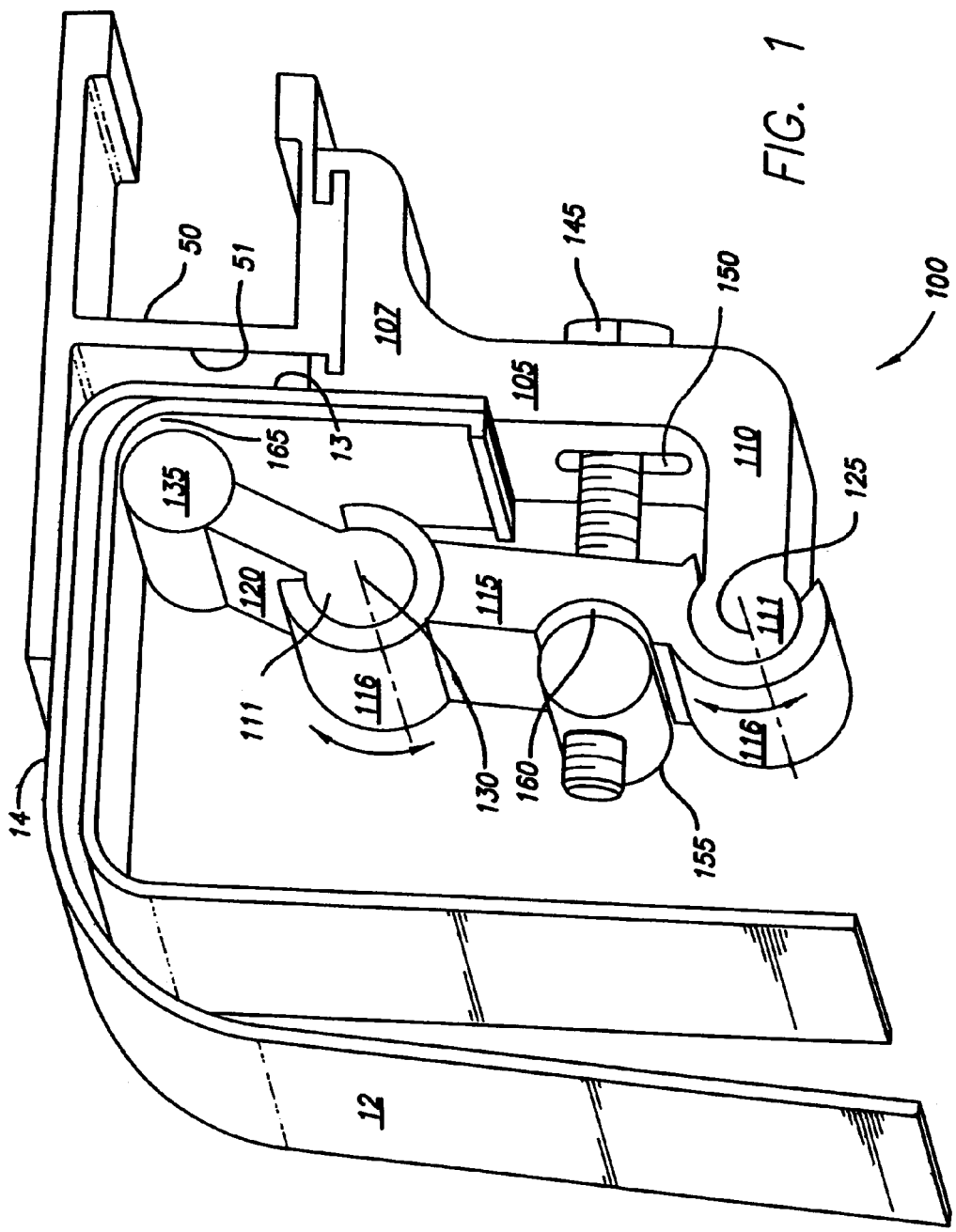
FIG. 1 is a perspective view of a clamp used to attach a rail that is part of a retractable cover system.

Referring to FIG. 1, rails 50 that are used with the retractable cover are attached to the truck bed 12 by rail clamp or clamp 100. Illustrated in FIGS. 1 and 2, the clamp 100 enables a quicker, easier installation of the rails 50 to the truck bed 12. The rails 50 can be attached to the truck bed 12 without drilling any holes in the truck bed 12. One feature of the clamp 100 is an upper pivot arm 120 that pivots to find the inner corner 165 of the truck bed 12. As the clamp 100 is tightened with fastener 145 and barrel nut 155 (or other suitable fastener) the upper pivot arm end 135 is pushed into the inner corner 165, thereby pulling the rail 50 against the truck bed 12. In addition, as the fastener 145 is tightened, the lower pivot arm 115 rotates about lower pivot axis 125. This causes the upper pivot arm 120 to rotate about upper pivot axis 130. This has the effect of forcing the upper pivot arm 120 to attempt to substantially align with the lower pivot arm 115. As the upper pivot arm 120 attempts to align with the lower pivot arm 115, the combined effective length of both arms becomes longer, causing the upper pivot arm end 135 to exert an upward and inward force against the inner corner 165. This upward force pulls the rail 50 downward against the truck bed 12. Therefore, not only does the clamp 100 exert a horizontal force to pull the rail 50 against the truck bed side surface 13, but simultaneously the clamp 100 also exerts a vertical force to pull the rail 50 against the truck bed top surface 14. This ensures a secure connection of the rail 50 against the truck bed 12.

Figure 2:
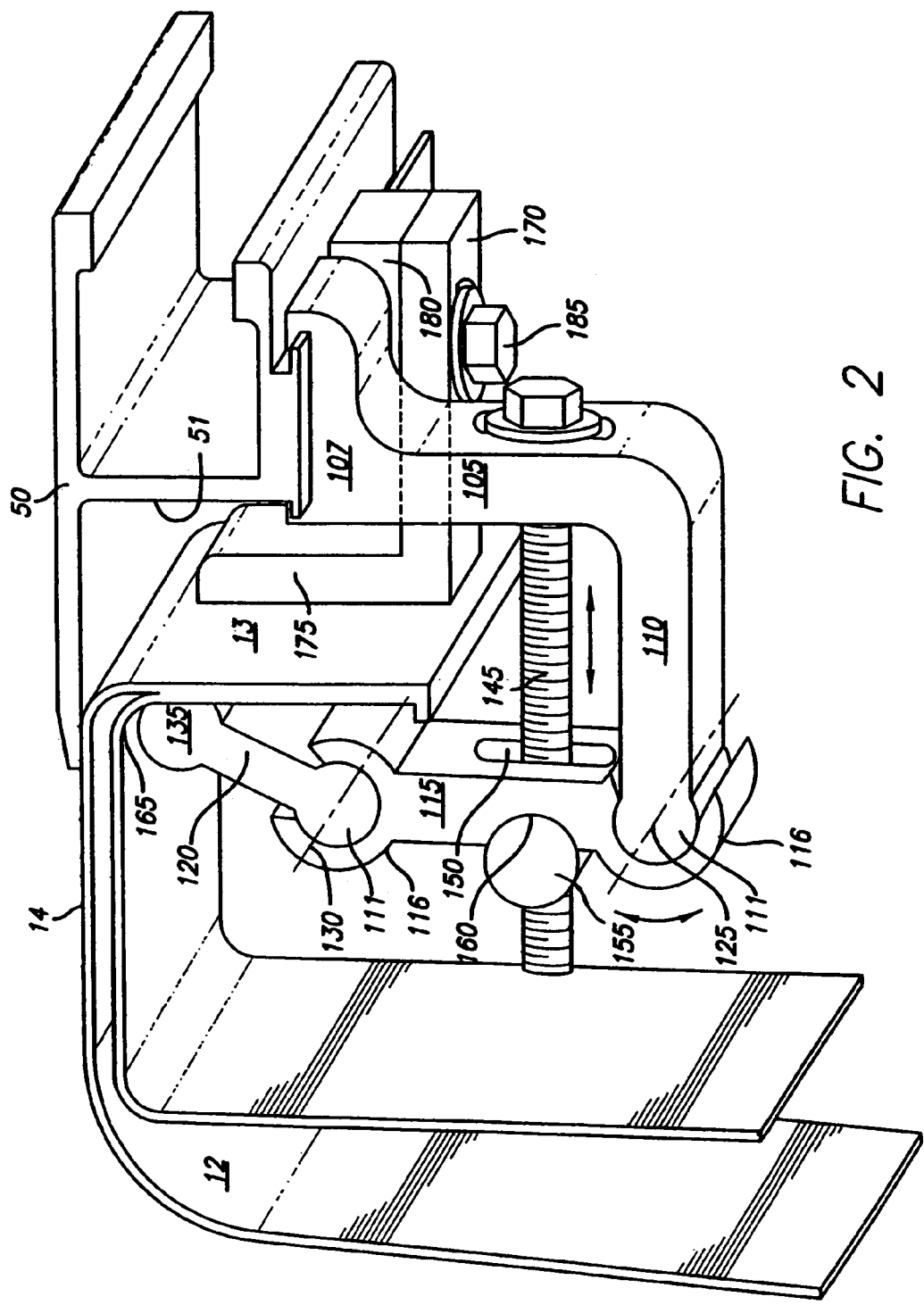
FIG. 2 is a second perspective view of the clamp illustrated in FIG. 1.

Referring to FIGS. 1 and 2, rail clamp or clamp 100 is illustrated. The clamp 100 comprises a rail member 105 that includes a mating end 107 that is sized to slidingly engage the rail 50. The rail member 105 also includes a rail member leg 110 that terminates in a substantially circular cross-section end 111. The rail member 105 also includes a slot 150 for receiving a threaded fastener 145. Rotably coupled to the rail member 105 is lower pivot arm 115. Lower pivot arm 115 includes a curved end 116 having a substantially circular cross-section that is sized to receive the circular end 111 of the rail member 105 in a cylinder-and-socket arrangement. This allows the lower pivot arm 115 to pivot about lower pivot axis 125. The lower pivot arm 115 also includes a slot 150 that receives the threaded fastener 145. The fastener 145 threadably engages the barrel nut 155 that is located and in the radiused channel 160. Because the barrel nut 155 is positioned in the radiused channel 160, when the fastener 145 is rotated during the tightening process, the barrel nut 155 does not rotate, which eases installation of the clamp 100. In another embodiment, an alternative type of fastening nut may be employed, such as a hex-nut that would be located in a recessed hex-shaped cavity.

Lower pivot arm 115 also includes a second curved end 116 that is shaped to receive a circular end 111 of the upper pivot arm 120. The circular end 111 and curved end 116 creates a cylinder-and-socket joint which allows the upper pivot arm 120 to rotate about upper pivot axis 130. The upper pivot arm 120 also includes an upper pivot arm end 135 that is also substantially circular in cross-section. Other shapes for the upper pivot arm end 135 may also be employed, such as an ellipse or a shape that would mate with the inner corner 165 of the truck bed 12.

Referring to FIG. 2, a clamp shim 170 is illustrated. The clamp shim 170 is substantially L-shaped and includes a foot section 175 that engages the truck bed side surface 13. The clamp shim 170 is employed to prevent the rail 50 from bending excessively when the clamp 100 is tightened. Specifically, as the clamp 100 is tightened by rotating fastener 145, the clamp 100 pulls the rail 50 towards the truck bed 12. This may cause the rail 50 to bend. One feature of pickup truck beds is that they are not "square." That is, the distance from one truck bed side surface 13 to the other truck bed side surface 13 may vary from the front to the rear of the truck bed 12. This variation in width may be as much as 3½ inches. Therefore, the rail 50, as illustrated in FIG. 1, may be directly adjacent to the truck bed side surface 13 near the rear of the truck bed 12. However, near the front of the truck bed, as illustrated in FIG. 2, the rail 50 may be several inches away from the truck bed side surface 13. Alternatively, the front of the truck bed 12 may be narrower than the rear of the truck bed 12. For this reason, a clamp shim 170 is employed to keep the force generated by the clamp 100 from bending the rail 50. Clamp shim 170 includes a rail block 180 that slidingly engages the rail 50 and is fastened to the clamp shim 170 by short fastener 185. The mating surfaces of the clamp shim 170 and rail block 180 include serrations, or other surface features that cause the two components to substantially lock together in a suitable position relative to each other. The serrations, or other surface irregularities keep the two components substantially fixed relative to each other with only a minimal amount of pressure. This eases the installation of the clamp shim 170, by keeping the two parts correctly positioned while the installer secures the short fastener 185 so that both parts are fixed relative to each other. The accurate installation of the clamp shim 170 ensures that the rail 50 is not bent by the force generated by the clamp 100.

For example, illustrated in FIG. 1, a clamp 100 includes a rail member 105 that has a rail member leg 110 that is substantially shorter than the rail member leg 110 illustrated in FIG. 2. This is because in FIG. 1, the bed-facing rail surface 51 is significantly closer to the truck bed side surface 13 than the bed-facing rail surface 51 illustrated in FIG. 2. Therefore, a clamp 100 with a shorter rail member leg 110 may be employed. One or more shims (not shown) may be positioned between the bed-facing rail surface 51 and the truck bed side surface 13. Preferably, the shims are plastic and are positioned to prevent the rail 50 from bending as a result of the forces generated by the clamp 100. Illustrated in FIG. 2, a clamp 100 with a long rail member leg 110 is employed where a substantial gap exists between the bed-facing rail surface 51 and the truck bed side surface 13. Instead of using one or more shims, a clamp shim 170 is employed. By providing clamps 100 that have different length rail member legs 100, the present invention retractable cover 10 can be installed on truck beds 12 that are not "square."

Figure 3:
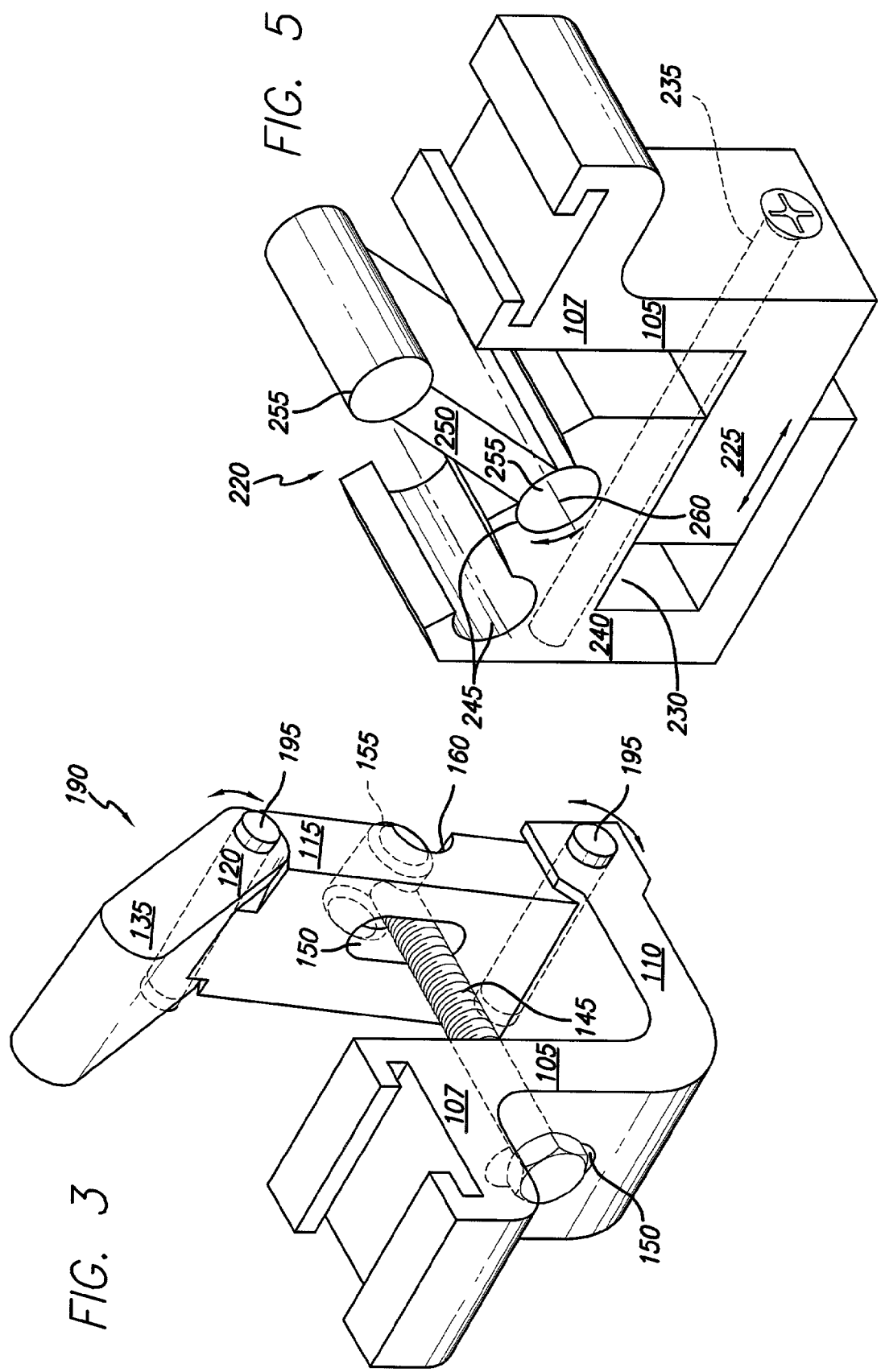
FIG. 3 is a second embodiment clamp.

Referring to FIG. 3, an alternative embodiment clamp, a hinge clamp 190 is illustrated. The hinge clamp 190 comprises a rail member 105 that includes a rail mating end 107 and a rail member leg 110. The hinge clamp 190 also includes a lower pivot arm 115 and an upper pivot arm 120. The upper pivot arm 120 has an upper pivot arm end 135 that is substantially curved in cross-section. Fastener 145 extends through slots 150, and barrel nut 155 is positioned in radiused channel 160. In contrast to the clamp 100, the hinge clamp 190 includes two hinge pins 195 that join the upper pivot arm 120 to the lower pivot arm 115, and the lower pivot arm 115 to the rail member leg 110. The hinge clamp 190 operates in a similar fashion to the clamp 110 described above.

Figure 4:
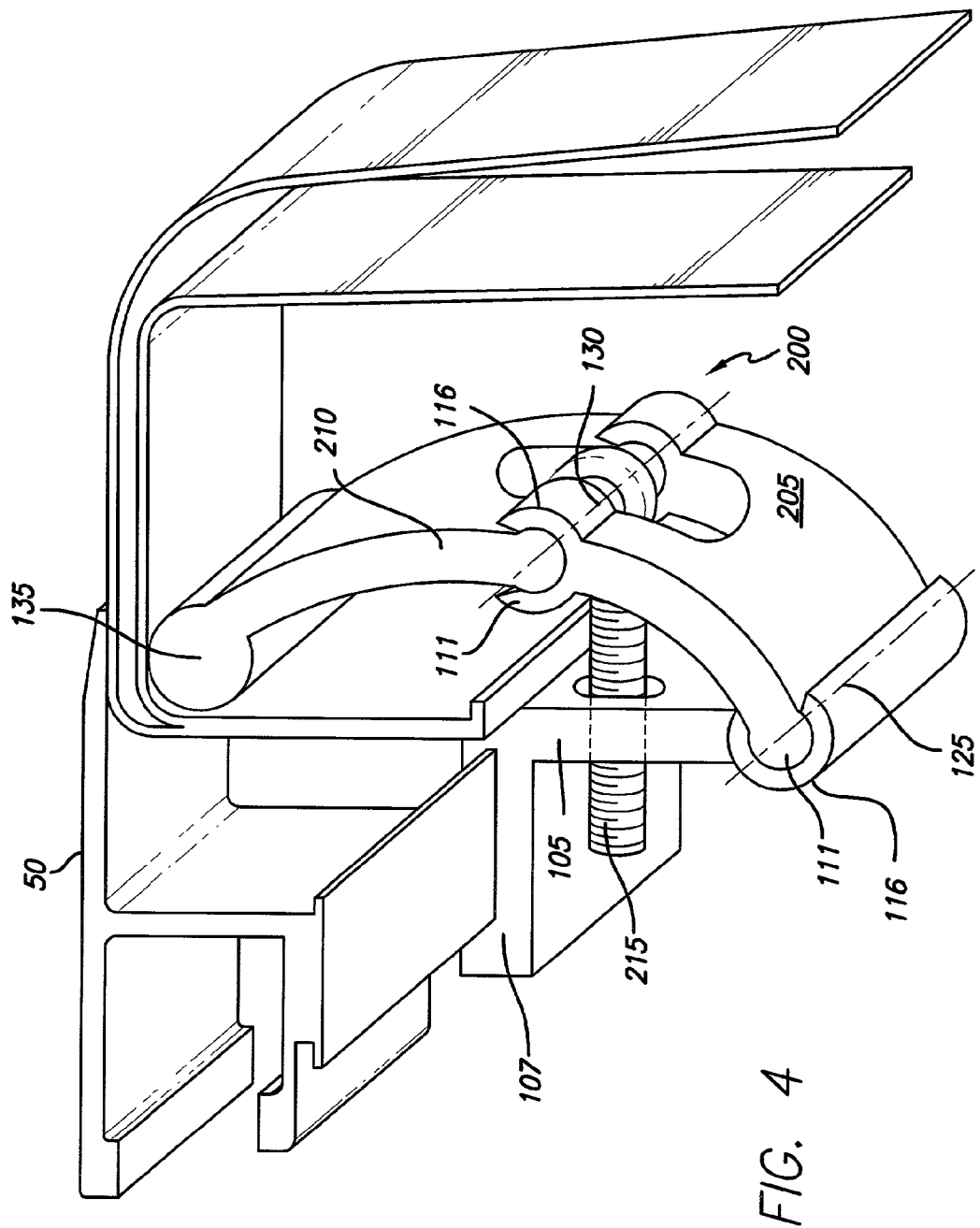
FIG. 4 is another embodiment clamp.

Referring to FIG. 4, a third embodiment clamp, a curved clamp 200 is illustrated. The curved clamp 200 includes a rail member 105 that has a mating end 107 for slidingly engaging the rail 50 and a circular end 111 of substantially circular cross-section for pivotably engaging a curved end of a curved lower pivot arm 205. The curved lower pivot arm 205 includes a curved end 111 that engages a circular end 116 in a cylinder-and-socket arrangement. A second cylinder-and-socket arrangement is located at the joint between the curved lower pivot arm 205 and the curved upper pivot arm 210. The two cylinder-and-socket joints create a lower pivot axis 125 and an upper pivot axis 130. The curved upper pivot arm 210 terminates in an upper pivot arm end 135 that is substantially circular in cross-section. The curved clamp 200 functions substantially similar to the clamp 100 but employs an eye-bolt 215 and a nut (not shown).

Referring to FIG. 5, another embodiment clamp, a slotted clamp 220 is illustrated. The slotted clamp 220 comprises a rail member 105 that includes a rail mating end 107. A slot member 225 is attached to the rail member 105 and slidingly engages pivot block slot 230. Slot fastener 235 extends through the slot member 225 and threadably engages the pivot block 240. The pivot block 240 includes two substantially cylindrical pivot slots 245. Pivot arm 250 includes two pivot arm ends 255 that have substantially cylindrical cross-sections. The pivot arm 250 can be positioned from one pivot slot 245 to the second pivot slot 245 depending upon the relative positions between the bed-facing rail surface 51 (not shown) and the truck bed side surface 13. As discussed above, the truck bed 12 may not be "square"0 and therefore the distance between the bed-facing rail surface 51 and the truck bed side surface 13 may vary. Therefore, the two pivot slots 245 allow for the pivot arm 250 to be positioned in the most appropriate slot.

All of the above-described clamps, 100, 190, 200 and 220 are preferably manufactured from an aluminum alloy. However, other types of materials such as metals, metal alloys, plastics, polymers and other suitable materials may be used to manufacture the above-described clamps.

Thus, it is seen that an apparatus and method for enclosing cargo areas, such as a pickup truck bed, is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A clamp, comprising:
    a first member having portions substantially perpendicular to each other forming first and second engagement surfaces of the clamp, the first member being coupled to a second member;
    a third member having first and second ends, with the first end of the third member being pivotally coupled to the second member, and the second end of the third member forming a third engagement surface of the clamp;
    a fastener having a longitudinal axis and being coupled to the first and second members and adapted to move the second member toward the first member along the axis of the fastener thereby causing the second end of the third member to move toward each of the respective first and second engagement surfaces; and
    wherein the fastener coupled to the first and second members comprises an externally threaded rod portion comprising a bolt and an internally threaded nut portion comprising a barrel nut.

2. The clamp of claim 1, wherein the first end of the third member is pivotally coupled to the second member by a cylinder-and-socket coupling.

3. The clamp of claim 1, wherein the first end of the third member is pivotally coupled to the second member by a hinge having a pin.

4. The clamp of claim 1, wherein the first member is pivotally coupled to the second member by a cylinder-and-socket coupling.

5. The clamp of claim 1, wherein the first member is pivotally coupled to the second member by a hinge having a pin.

6. A clamp, comprising:
    a first member having portions substantially perpendicular to each other forming first and second engagement surfaces of the clamp, the first member being coupled to a second member;
    a third member having first and second ends, with the first end of the third member being pivotally coupled to the second member, and the second end of the third member forming a third engagement surface of the clamp;
    a fastener having a longitudinal axis and being coupled to the first and second members and adapted to move the second member toward the first member along the axis of the fastener thereby causing the second end of the third member to move toward each of the respective first and second engagement surfaces; and
    wherein the fastener passes through an aperture in the first member and the fastener further is coupled to the first end of the third member.

7. The clamp of claim 6, wherein the fastener further passes through an aperture in the second member.

8. The clamp of claim 1, wherein the first member slidingly engages the second member.

9. The clamp of claim 8, wherein the second member comprises a pivot block pivotally coupled to the first end of the third member.

10. The clamp of claim 8, wherein the second member comprises a pivot block having a plurality of spaced apart positions by which the pivot block may be pivotally coupled to the first end of the third member.

11. The clamp of claim 1, wherein the first member comprises at least two portions coupled to each other to form the first and second engagement surfaces.

12. The clamp of claim 11, wherein the two portions of the first member are adapted to be joined by sliding engagement with each other.

13. The clamp of claim 11, wherein the first member comprises at least three portions coupled to each other to form the first and second engagement surfaces.

* * * * *